United States Patent [19]
Story et al.

[11] Patent Number: 5,905,912
[45] Date of Patent: May 18, 1999

[54] SYSTEM FOR IMPLEMENTING PERIPHERAL DEVICE BUS MASTERING IN A COMPUTER USING A LIST PROCESSOR FOR ASSERTING AND RECEIVING CONTROL SIGNALS EXTERNAL TO THE DMA CONTROLLER

[75] Inventors: Franklyn H. Story, Chandler; David R. Evoy, Tempe; Peter Chambers, Scottsdale; Lonnie Goff, Tempe, all of Ariz.

[73] Assignee: VLSI Technology, Inc., San Jose, Calif.

[21] Appl. No.: 08/627,989

[22] Filed: Apr. 8, 1996

[51] Int. Cl.⁶ .................................................. G06F 13/00
[52] U.S. Cl. .......................................... 395/847; 395/843
[58] Field of Search .................................... 395/842, 680, 395/287, 183.01, 294, 848, 821, 843, 847

[56] References Cited

U.S. PATENT DOCUMENTS

| | | | |
|---|---|---|---|
| 4,530,053 | 7/1985 | Kriz et al. ................................ | 395/842 |
| 4,937,737 | 6/1990 | Schwane et al. ........................ | 395/680 |
| 5,444,855 | 8/1995 | Thompson ............................... | 395/287 |
| 5,524,208 | 6/1996 | Finch et al. ............................. | 395/183.01 |
| 5,546,547 | 8/1996 | Bowes et al. ............................ | 395/294 |
| 5,561,821 | 10/1996 | Gephardt et al. ...................... | 395/848 |
| 5,590,377 | 12/1996 | Smith ...................................... | 395/842 |
| 5,603,050 | 2/1997 | Wolford et al. ........................ | 395/821 |

*Primary Examiner*—Thomas C. Lee
*Assistant Examiner*—David Ton
*Attorney, Agent, or Firm*—Harry M. Weiss; Jeffrey D. Moy; Harry M. Weiss & Associates, P.C.

[57] ABSTRACT

The present invention relates to a system and method for implementing peripheral device bus mastering via a general purpose list processor. The system is comprised of four main elements: a bus controller, a DMA controller, a list processor, and a device controller. The system operates under two modes of operation. The two modes arise from the two distinct modules: the DMA controller and the list processor. The first mode of operation is a single buffer transfer mode which is directly compatible with a distributed DMA model. Under this mode, distributed DMA registers within the DMA controller are programmed to transfer a single contiguous buffer of data. The second mode of operation is a multiple buffer transfer mode which uses linked lists of buffer transfer descriptors to program the distributed DMA registers within the DMA controller and initiates transfers independent of software.

14 Claims, 13 Drawing Sheets

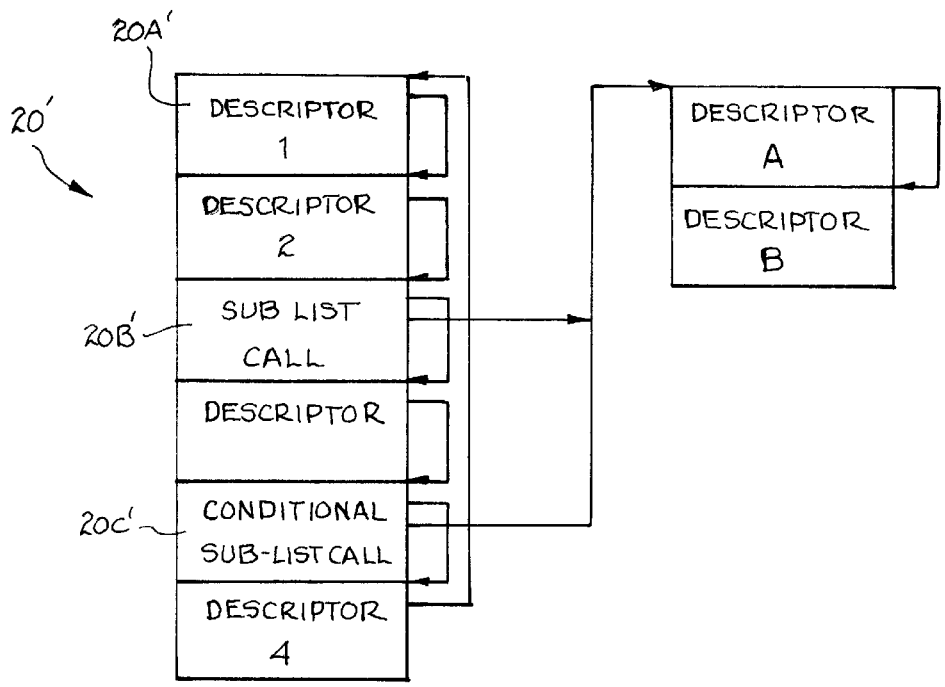

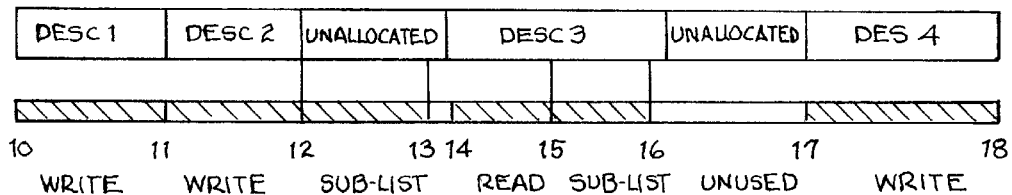

10 START OF FRAME; DESCRIPTOR 1 WRITES DATA TO DEVICE
11 END OF DESCRIPTOR'S TIME SLOT AND START OF DESCRIPTOR 2's TIME SLOT
12 END OF DESCRIPTOR 2's TIME SLOT, UNCONDITIONAL CALL TO SUB-LIST, AND START OF DESCRIPTOR A
13 END OF DESCRIPTOR A TRANSFER, DESCRIPTOR B's TRANSFER IS TOO LARGE AND IS SKIPPED
14 START OF DESCRIPTOR 3's TIME SLOT
15 DESCRIPTOR 3's READ TRANSFER ENDS EARLY, CONDITIONAL SUB-LIST CALL IS SUCCESSFUL, DESCRIPTOR A's MUST FLAG IS CLEAR, DESCRIPTOR B IS STARTED.
16 END OF DESCRIPTOR B TRANSFER AN UNALLOCATED SLOT EXISTS FROM 16 UNTIL 17
17 START OF DESCRIPTOR 4's TIME SLOT
18 END OF DESCRIPTOR 4's TIME SLOT

Fig. 2A

| MASTER REG 00h | D31 | D30 | D29 | D28 | D27 | D26 | D25 | D24 |
|---|---|---|---|---|---|---|---|---|
| | ADDR(31:24) | | | | | | | |
| POR VALUE 00000000h | 0 | 0 | 0 | 0 | 0 | 0 | 0 | 0 |
| | D23 | D22 | D21 | D20 | D19 | D18 | D17 | D16 |
| | ADDR(23:16) | | | | | | | |
| | 0 | 0 | 0 | 0 | 0 | 0 | 0 | 0 |
| | D15 | D14 | D13 | D12 | D11 | D10 | D9 | D8 |
| | ADDR(15:8) | | | | | | | |
| | 0 | 0 | 0 | 0 | 0 | 0 | 0 | 0 |
| | D7 | D6 | D5 | D4 | D3 | D2 | D1 | D0 |
| | ADDR(7:0) | | | | | | | |
| | 0 | 0 | 0 | 0 | 0 | 0 | 0 | 0 |

| BIT | NAME | FUNCTION |
|---|---|---|
| 31:0 | ADDR | ADDRESS. THIS FIELD SETS THE ADDRESS OF THE CURRENT DATA BUFFER |

Fig. 3

| MASTER REG 04h | D31 | D30 | D29 | D28 | D27 | D26 | D25 | D24 |
|---|---|---|---|---|---|---|---|---|
| | R | R | R | R | R | R | R | R |
| POR VALUE 00000000h | 0 | 0 | 0 | 0 | 0 | 0 | 0 | 0 |
| | D23 | D22 | D21 | D20 | D19 | D18 | D17 | D16 |
| | COUNT(23:16) | | | | | | | |
| | 0 | 0 | 0 | 0 | 0 | 0 | 0 | 0 |
| | D15 | D14 | D13 | D12 | D11 | D10 | D9 | D8 |
| | COUNT(15:8) | | | | | | | |
| | 0 | 0 | 0 | 0 | 0 | 0 | 0 | 0 |
| | D7 | D6 | D5 | D4 | D3 | D2 | D1 | D0 |
| | COUNT(7:0) | | | | | | | |
| | 0 | 0 | 0 | 0 | 0 | 0 | 0 | 0 |

| BIT | NAME | FUNCTION |
|---|---|---|
| 31:0 | COUNT | COUNT. THIS FIELD SETS THE BYTE COUNT OF THE CURRENT DATA BUFFER |

THE ONLY BIT IMPLEMENTED IN THE DMA COMMAND REGISTER IS THE CONTROLLER DATA BIT.

Fig. 4

| MASTER REG 08h | D7 | D6 | D5 | D4 | D3 | D2 | D1 | D0 |
|---|---|---|---|---|---|---|---|---|
| | MODE | | ADDEC | AUTINIT | DIR | | X | X |
| POR VALUE 00h | 0 | 0 | 0 | 0 | 0 | 0 | 0 | 0 |

(26A spans D3-D2; register 26)

| BIT | NAME | FUNCTION |
|---|---|---|
| 7:6 | MODE | DMA MODE. THESE BITS ARE TIED TO ZERO AND WRITE DATA IS IGNORED |
| 5 | ADDEC | ADDRESS DECREMENT. THIS BIT IS TIED TO ZERO AND WRITE DATA IS IGNORED |
| 4 | AUTINIT | AUTO-INITIALIZE. THIS BIT IS TIED TO ZERO AND WRITE DATA IS IGNORED |
| 3:2 | DIR | TRANSFER DIRECTION<br>00 = RESERVED<br>01 = WRITE TO MEMORY<br>10 = READ FROM MEMORY<br>11 = RESERVED |
| 1:0 | X | DON'T CARE. THESE BITS HAVE NO EFFECT ON THE CONTROLLER |

Fig. 5

| MASTER REG 08h | D7 | D6 | D5 | D4 | D3 | D2 | D1 | D0 |
|---|---|---|---|---|---|---|---|---|
| | DACKHI | DRQLO | EXTWR | ROTPRI | CMPTIM | DISABL | ADRHLD | M2M |
| POR VALUE 00h | 0 | 0 | 0 | 0 | 0 | 0 | 0 | 0 |

(28A spans D2; register 28)

| BIT | NAME | FUNCTION |
|---|---|---|
| 7 | DACKHI | DACK ACTIVE HIGH. THIS BIT IS TIED TO ZERO AND WRITE DATA IS IGNORED. |
| 6 | DRQLO | DRQ ACTIVE LOW. THIS BIT IS TIED TO ZERO AND WRITE DATA IS IGNORED. |
| 5 | EXTWR | EXTENDED WRITE. THIS BIT IS TIED TO ZERO AND WRITE DATA IS IGNORED. |
| 4 | ROTPRI | ROTATING PRIORITY. THIS BIT IS TIED TO ZERO AND WRITE DATA IS IGNORED. |
| 3 | CMPTIM | COMPRESSED TIMING. THIS BIT IS TIED TO ZERO AND WRITE DATA IS IGNORED. |
| 2 | DISABL | CONTROLLER DISABLE. WHEN SET, THIS BIT DISABLES THE BUS MASTER CONTROLLER. |
| 1 | ADRHLD | CHANNEL 0 ADDRESS HOLD. THIS BIT IS TIED TO ZERO AND WRITE DATA IS IGNORED. |

Fig. 6

| MASTER REG 10h | D31 | D30 | D29 | D28 | D27 | D26 | D25 | D24 |
|---|---|---|---|---|---|---|---|---|
| | DESCADDR (31:24) | | | | | | | |
| POR VALUE 00000000h | 0 | 0 | 0 | 0 | 0 | 0 | 0 | 0 |
| | D23 | D22 | D21 | D20 | D19 | D18 | D17 | D16 |
| | DESCADDR (23:16) | | | | | | | |
| | 0 | 0 | 0 | 0 | 0 | 0 | 0 | 0 |
| | D15 | D14 | D13 | D12 | D11 | D10 | D9 | D8 |
| | DESCADDR (15:8) | | | | | | | |
| | 0 | 0 | 0 | 0 | 0 | 0 | 0 | 0 |
| | D7 | D6 | D5 | D4 | D3 | D2 | D1 | D0 |
| | DESCADDR (7:2) | | | | | | RESTRT | ENABLE |
| | 0 | 0 | 0 | 0 | 0 | 0 | 0 | 0 |

34B (bits 31:2), 34A (bits 1:0)

| BIT | NAME | FUNCTION |
|---|---|---|
| 31:2 | DESCADDR | DESCRIPTOR LIST ADDRESS. THIS FIELD SETS THE ADDRESS OF THE CURRENT TRANSFER DESCRIPTOR. AS EACH DATA TRANSFER IS COMPLETED, THIS REGISTER IS UPDATED TO POINT TO THE NEXT DESCRIPTOR IN THE LINKED LIST OF DESCRIPTORS AND THE NEXT TRANSFER IS INITIATED. IF A DESCRIPTOR HAS ITS EOT FLAG SET, INDICATING THAT IT IS THE LAST DESCRIPTOR IN THE LIST, THIS FIELD IS UPDATED WITH THE NEXT DESCRIPTOR'S ADDRESS, HOWEVER THE MASK BIT IS SET AND THE TRANSFER IS NOT INITIATED. |
| 1 | RESTRT | AUTOMATIC RESTART ENABLE. WHEN THIS BIT IS SET, THE ENABLE BIT MAY BE SET BY THE ASSERTION OF A RESTART SIGNAL. THIS ALLOWS AUTOMATIC LIST PROCESSING AT A RATE CONTROLLED BY HARDWARE EVENTS. |
| 0 | ENABLE | DESCRIPTOR LIST ENABLE. WHEN THIS BIT IS SET, THE PROCESSOR WILL PROCESS THE LINKED LIST POINTED TO BY DESCADDR AND LOAD THE DMA REGISTERS APPROPRIATLY. WHEN THIS BIT IS ZERO, THE DMA REGISTERS MUST BE PROGRAMMED DIRECTLY BY SOFTWARE. |

Fig. 9

| DESCR OFFSET 00h | D31 | D30 | D29 | D28 | D27 | D26 | D25 | D24 |
|---|---|---|---|---|---|---|---|---|
| | FWDLINK (31:24) | | | | | | | |
| | D23 | D22 | D21 | D20 | D19 | D18 | D17 | D16 |
| | FWDLINK (23:16) | | | | | | | |
| | D15 | D14 | D13 | D12 | D11 | D10 | D9 | D8 |
| | FWDLINK (15:8) | | | | | | | |
| | D7 | D6 | D5 | D4 | D3 | D2 | D1 | D0 |
| | FWDLINK(7:2) | | | | | | R | EOT |

36A

| BIT | NAME | FUNCTION |
|---|---|---|
| 31:2 | FWDLINK | FORWARD LINK. THIS IS THE ADDRESS OF THE NEXT TRANSFER DESCRIPTOR IN THE LINKED LIST. |
| 1 | R | RESERVED. THIS BIT SHOULD ALWAYS BE WRITTEN ZERO. |
| 0 | EOT | END OF TRANSFERS. WHEN THIS BIT IS SET, THE TRANSFER DESCRIBED IN THIS DESCRIPTOR IS COMPLETED. THE DMA ENGINE'S MASK BIT IS LEFT SET, THE DESCADDR IS UPDATED WITH THE FWDLINK, THE ENABLE BIT IN THE DESCADDR REGISTER IS CLEARED AND THE LIST PROCESSOR BECOMES IDLE UNTIL THE ENABLE BIT IS SET. THIS BIT SHOULD BE SET IN THE LAST DESCRIPTOR OF A LINKED LIST, IT SHOULD BE SET IN THE DESCRIPTORS AFTER WHICH SOFTWARE INTERVENTION OR A WAIT FOR A HARDWARE EVENT IS DESIRED. |

Fig. 10

| OFFSET | BYTE LANE 3 | BYTE LANE 2 | BYTE LANE 1 | BYTE LANE 0 |
|---|---|---|---|---|
| -0CH | ETC ||||
| -08H | USER-DEFINED ||||
| -04H | USER-DEFINED ||||
| 00H | FORWARD LINK ||||
| 04H | BUFFER ADDRESS ||||
| 08H | RSVD | TRANSFER COUNT |||
| 0CH | RSVD | RECEIVE COUNT |||
| 10H | COMMAND ||||
| 14H | STATUS ||||
| 18H | RSVD | RSVD | TIME SLOT ||
| 1CH | USER-DEFINED ||||
| 20H | USER-DEFINED ||||
| 24H | ETC. ||||

*Fig. 10A*

| DESCR OFFSET | 38A {D31, D30} | | | | | | 38 → | |
|---|---|---|---|---|---|---|---|---|
| | D31 | D30 | D29 | D28 | D27 | D26 | D25 | D24 |
| | BUSY | INTR | PHYERR | CRCERR | LENGTH | UNDRN | OVERN | NACK |
| | D23 | D22 | D21 | D20 | D19 | D18 | D17 | D16 |
| | CERR | STALL | R | R | R | R | R | R |
| | D15 | D14 | D13 | D12 | D11 | D10 | D9 | D8 |
| | R | R | R | R | R | R | R | R |
| | D7 | D6 | D5 | D4 | D3 | D2 | D1 | D0 |
| | R | R | R | R | R | R | R | R |

| BIT(S) | NAME | FUNCTION |
|---|---|---|
| 31 | BUSY | BUSY. WHEN THIS BIT IS A ONE, THE CONTROLLER OWNS THE BUFFER AND THE BUFFER IS BUSY. IT IS WRITTEN TO A ZERO WHEN THE BUFFER TRANSFER IS COMPLETED. |
| 30 | INTR | INTERRUPT GENERATED. THIS BIT IS SET WHEN AN INTERRUPT WAS GENERATED DUE TO THE COMPLETION OF THE TRANSFER. IT SHOULD BE INITIALIZED TO ZERO AND CLEARED TO ZERO DURING INTERRUPT PROCESSING. |
| 29 | PHYERR | PHYSICAL ERROR. THE PHYSICAL LAYER DETECTED AN ENCODING ERROR. |
| 28 | CRCERR | CRC ERROR. A RECEIVE CRC ERROR OCCURRED. |
| 27 | LENGTH | LENGTH ERROR. THE END OF THE RECEIVE BUFFER (THE LAST BUFFER IF ITS SEQUENCE OF SCATTERED BUFFERS) WAS REACHED BEFORE THE RECEIVE TRANSFER WAS TERMINATED. ONCE THE MAXIMUM LENGTH IS HIT, NO OTHER DATA WILL BE STORED INTO THE DATA STORAGE AREA. |
| 26 | UNDRN | UNDERRUN. AN UNDERRUN OCCURED DURING THE TRANSMISSION OF THIS PACKET. THIS BIT WILL BE SET BY THE HARDWARE AT THE CLOSE OF A PACKET IF AN OVERRUN OCCURS. THEORETICALLY THIS SHOULD NOT BE ABLE TO HAPPEN AND WOULD INDICATE A HARDWARE PROBLEM. THIS BIT SHOULD BE INITIALIZED TO ZERO. |
| 25 | OVERN | OVERRUN. THE RECEIVE FIFO OVERFLOWED. AS IN THE CASE OF UNDER-RUNS, THIS SHOULD NOT OCCUR. |
| 24 | NACK | NEGATIVE ACKNOWLEDGE. THE TARGET COULD'NT ACCEPT DATA (HOST TRANSMIT) OR HAD NO DATA TO SEND (HOST RECEIVE) |
| 23 | CERR | TARGET CER ERROR. THE TARGET ACCEPTED THE TRANSMITTED DATA BUT THE CRC FAILED. |
| 22 | STALL | ENDPOINT STALL. THE ENDPOINT CANNOT TRANSFER DATA DUE TO A CONDITION THAT REQUIRES HOST SOFTWARE INTERVENTION. ENDPOINT STALLS MAY NOT OCCUR ON ENDPOINT ZERO. |
| 21:0 | R | RESERVED. THESE BITS SHOULD BE WRITTEN ZERO. |

Fig. 11

| MASTER REG 14h | D7 | D6 | D5 | D4 | D3 | D2 | D1 | D0 |
|---|---|---|---|---|---|---|---|---|
| | PMEN | PMINT | LISTEN | LISTINT | CONTEN | CONTINT | TCEN | TCINT |
| POR VALUE 00h | 0 | 0 | 0 | 0 | 0 | 0 | 0 | 0 |

| BIT | NAME | FUNCTION |
|---|---|---|
| 7 | PMEN | POWER MANAGEMENT INTERRUPT ENABLE. IF THIS BIT IS SET, AN INTERRUPT IS GENERATED WHENEVER PWRINT CHANGES FROM A ZERO TO ONE. |
| 6 | PWRNT | POWER MANAGEMENT INTERRUPT. THIS BIT IS SET WHENEVER A POWER MANAGEMENT EVENT OCCURS. EVENTS INCLUDE, BUT ARE NOT LIMITED TO, DEVICE CONNECT, DEVICE DISCONNECT AND OVER-CURRENT. |
| 5 | LISTEN | LIST END INTERRUPT ENABLE. IF THIS BIT IS SET, AN INTERRUPT IS GENERATED WHENEVER LISTINT CHANGES FROM A ZERO TO A ONE. |
| 4 | LISTINT | LIST END INTERRUPT. THIS BIT IS SET AFTER A LIST DESCRIPTOR WITH EOT SET HAS FINISHED BEING PROCESSED. |
| 3 | CONTEN | CONTINUED DESCRIPTOR END INTERRUPT ENABLE. IF THIS BIT IS SET, AN INTERRUPT IS GENERATED WHENEVER A LIST DESCRIPTOR WITH THE CONT BIT CLEAR ENDS ITS TRANSFER. |
| 2 | CONTINT | CONTINUED DESCRIPTOR END INTERRUPT. THIS BIT IS SET AFTER A LIST DESCRIPTOR WITH CONT CLEAR HAS FINISHED BEING PROCESSED. |
| 1 | TCEN | TERMINAL COUNT INTERRUPT ENABLE. IF THIS BIT IS SET, AN INTERRUPT IS GENERATED WHENEVER TCINT CHANGES FROM A ZERO TO A ONE. |
| 0 | TCINT | TERMINAL COUNT INTERRUPT. THIS BIT IS SET BY TC BEING SET. IT IS CLEARED BY WRITING A ONE TO IT. |

Fig. 12

| DESCR OFFSET 14 | D31 ACTIVE | D30 CONT | D29 RETRY | D28 PER | D27 MUST | D26 SUBLIST | D25 DIR | D24 |
|---|---|---|---|---|---|---|---|---|
| | D23 DISCRC | D22 BAD-CRC | D21 FRCUND | D20 HNACK | D19 R | D18 R | D17 DATIEN | D16 STIEN |
| | D15 | D14 | D13 | D12 FNADDR | D11 | D10 | D9 | D8 |
| | D7 R | D6 R | D5 R | D4 R | D3 R | D2 | D1 ENDPT | D0 |

42A, 42B, 42

| BIT(S) | NAME | FUNCTION |
|---|---|---|
| 31 | ACTIVE | DESCRIPTOR ACTIVE. WHEN THIS BIT IS SET, THE LIST DESCRIPTOR WILL BE PROCESSED. WHEN ACTIVE IS A ZERO, THE DESCRIPTOR IS SKIPPED AND PROCESSING CONTINUES WITH THE NEXT DESCRIPTOR. |
| 30 | CONT | TRANSFER CONTINUED. THE TRANSFER DESCRIPTOR IS CONTINUED IN THE NEXT DESCRIPTOR. WHEN THE TRANSFER COUNT IS REACHED, ALL STATUS BITS ARE CLEARED AND THE NEXT DISCRIPTOR IS OPENED TO DETERMINE THE ADDRESS FOR THE CONTINUATION OF THE TRANSFER. ALL COMMAND BITS IN THE NEXT DESCRIPTOR ARE IGNORED EXCEPT FOR THE CONT BIT. IF AN EARLY TERMINATION OF THE TRANSFER OCCURS, THE STATUS IN THE CURRENT DESCRIPTOR IS UPDATED WITH THE TERMINATION STATUS. THE STATUS IN ALL FOLLING DESCRIPTORS UP TO AND INCLUDING THE DESCRIPTOR WITH ITS CONT BIT CLEAR IS UPDATED WITH THE SAME STATUS. IF THE DIRECTION IS RECEIVE, THEN THE CURRENT DESCRIPTORS COUNT IS UPDATED WITH THE COUNT AT THE TIME OF THE TERMINATION AND THE FOLLOWING DESCRIPTOR'S COUNTS ARE CLEARED. |
| 29 | RETRY | RETRY ENABLE. IF THIS BIT IS SET, THE TRANSFER DEFINED BY THIS DESCRIPTOR WILL BE REPEATED WHEN THE RETRY SIGNAL IS ASSERTED WITH TERMINAL COUNT. |
| 28 | PER | PERIODIC DESCRIPTOR. IF THIS BIT IS SET, THE DESCRIPTOR IS CLASSIFIED AS A PERIODIC DESCRIPTOR, THAT IS ITS PROCESSING IS SCHEDULED TO OCCUR AT A SPECIFIC TIME RELATIVE TO THE START OF THE LIST. AN 8-BIT TIMER IS CLEARED AT THE START OF LIST PROCESSING (WHEN ENABLE IS SET) AND IS CLOCKED AT A RATE SET BY THE USB CONTROLLER. THE OUTPUT OF THE TIMER IS COMPARED WITH THE DESIRED TIME SLOT (TSLOT) AND PROCESSING OF THE DESCRIPTOR WAITS UNTIL THE TIMER IS GREATER THAN OR EQUAL TO THE TIME SLOT. IF THIS BIT IS CLEAR, THE DESCRIPTOR IS CLASSIFIED AS AN APERIODIC DISCRIPTOR. ITS PROCESSING IS CONDITIONAL ON THE ASSERTION OF A RESTART SIGNAL. IF THE SIGNAL IS ASSERTED, ANY DESCRIPTOR WITH THIS BIT SET IS SKIPPED AND ITS MUST FLAG IS SET. THE RESTART CONDITION WILL EXIST UNTIL A DESCRIPTOR WITH ITS EOT FLAG IS PROCESSED, AT WHICH TIME THE RESTART CONDITION IS CLEARED. AN APERIODIC DESCRIPTOR THAT IS IN PROCESS WHEN THE RESTART CONDITION IS ASSERTED WILL BE PROCESSED TO COMPLETION. |

| BIT(S) | NAME | FUNCTION |
|---|---|---|
| 27 | MUST | MUST PROCESS FLAG. WHEN THE INTERNAL MUST-PROCESS FLIP-FLOP IS SET, DESCRIPTORS WITH THIS FLAG CLEAR ARE SKIPPED. DESCRIPTORS WITH THIS FLAG SET HAVE THIS FLAG CLEARED, THEY ARE PROCESSED NORMALLY |
| 26 | SUBLIST | SUB-LIST CALL DESCRIPTOR, IF THIS BIT IS SET, THE DESCRIPTOR DESCRIBES A CALL TO A SUB-LIST. THE BUFFER ADDRESS IS THE POINTER TO THE HEAD OF THE SUB-LIST. IF THE TRANSFER COUNT IS GREATER THAN THE MAX COUNT, THEN THIS DESCRIPTOR IS SKIPPED, ALLOWING CONDITIONAL CALLS TO THE SUB-LIST. ONLY THE ACTIVE BIT HAS AN EFFECT IN SUB-LIST CALL DESCRIPTORS. |
| 25:24 | DIR | TRANSFER DIRECTION.<br>00 = RESERVED<br>01 = WRITE TO MEMORY<br>10 = READ FROM MEMORY<br>11 = RESERVED |
| 23 | DISCRC | DISABLE THE TRANSMIT CRC |
| 22 | BADCRC | FORCE BAD CRC. A 1 MEANS TO SEND OUT THE INVERTED CRC OR BAD CRC. THIS WOULD BE USED TO AS A TEST MECHANISM OF THE CRC VERIFICATION HARDWARE BY THE RECEIVER. |
| 21 | FRCUND | FORCE UNDERRUN. A 1 MEANS TO FORCE AN UNDER-RUN ON THIS PACKET FOR TESTING. FOR AN UNDER-RUN TO OCCUR, THE TRANSMIT COUNT SHOULD BE GREATER THAN THE FIFO SIZE. |
| 20 | KNACK | HOST NEGATIVE ACKNOWLEDGE ENABLE. WHEN THIS BIT IS SET, THE HOST WILL SEND A NACK PACKET AFTER THE OUT PACKET ON TRANSMIT REQUESTS THAT HAVE A ZERO COUNT. WHEN THIS BIT IS CLEAR, NO PACKET IS SENT AND THE DESCRIPTOR IS CLOSED WITH NO ERROR (IS THIS USEFUL?) |
| 19:18 | R | RESERVED. THESE BITS SHOULD BE WRITTEN ZERO. |
| 17 | DATIEN | DATA TRANSFER COMPLETE INTERRUPT ENABLE. IF THIS BIT IS SET AND THE CONT BIT IS CLEAR, THE CONTINT BIT IS SET IN THE INTERRUPT REGISTER WHEN THE DATA TRANSFER COMPLETES. |
| 16 | STIEN | STATUS UPDATE INTERRUPT ENABLE. IF THIS BIT IS SET AND THE CONT BIT IS CLEAR, THE CONTINT BIT IS SET IN THE INTERRUPT REGISTER WHEN ANY STATUS BIT OTHER THAN BUSY OR INTR IS WRITTEN TO A ONE. |
| 15:8 | FNADDR | FUNCTION ADDRESS. THE FNADDR FIELD SPECIFIES THE FUNCTION THAT IS THE SOURCE OR DESTINATION OF A DATA PACKET. THIS FIELD IS COPIED INTACT TO THE ADDRESS FIELD OF IN AND OUT PACKETS. |
| 7:3 | R | RESERVED. THESE BITS SHOULD BE WRITTEN TO ZERO. |
| 2:0 | ENDPT | END POINT. THE ENDPT FIELD SPECIFIES THE SUB-CHANNEL OF A FUNCTION THAT REQUIRES MORE THAN ONE CHANNEL. THIS FIELD IS COPIED INTACT TO THE END POINT FIELD OF IN AND OUT PACKETS. |

Fig. 13B

TIME SLOT

| DESCR OFFSET 1CH | D31 | D30 | D29 | D28 | D27 | D26 | D25 | D24 |
|---|---|---|---|---|---|---|---|---|
| 44B | ESLOT (15:8) | | | | | | | |
| | D23 | D22 | D21 | D20 | D19 | D18 | D17 | D16 |
| | ESLOT (7:0) | | | | | | | |
| 44A | D15 | D14 | D13 | D12 | D11 | D10 | D9 | D8 |
| | TSLOT (15:8) | | | | | | | |
| | D7 | D6 | D5 | D4 | D3 | D2 | D1 | D0 |
| | TSLOT (7:0) | | | | | | | |

| BIT(s) | NAME | FUNCTION |
|---|---|---|
| 31:16 | ESLOT | TRANSFER TIME SLOT END. IF THE PERIODIC BIT IS SET IN THE COMMAND, THE DESCRIPTOR'S TRANSFER WILL NOT EXTEND PAST THE TIME THAT THE 16-BIT TIME VALUE IS GREATER THAN OR EQUAL TO THIS VALUE. IF THE TRANSFER IS STILL IN PROGRESS WHEN THE 16-BIT TIME VALUE IS REACHED, THE LIST PROCESSOR ASSERTS THE TC SIGNAL TO THE DMA CONTROLLER AND UPDATES THE START ADDRESS AND TRANSFER COUNT TO REFLECT THE BYTES THAT WERE TRANSFERRED. |
| 15:0 | TSLOT | TRANSFER TIME SLOT. IF THE PERIODIC BIT IS SET IN THE COMMAND, THE DISCRIPTOR PROCESSING WILL NOT START UNTIL THE 16-BIT TIME VALUE IS GREATER THAN OR EQUAL TO THIS VALUE. |

Fig. 14

SYSTEM FOR IMPLEMENTING PERIPHERAL DEVICE BUS MASTERING IN A COMPUTER USING A LIST PROCESSOR FOR ASSERTING AND RECEIVING CONTROL SIGNALS EXTERNAL TO THE DMA CONTROLLER

RELATED APPLICATIONS

This application is related to the applications entitled "A MOBILE COMPUTER SYSTEM HAVING PERIPHERAL DEVICE BUS MASTERING AND METHOD THEREFOR," Ser. No. 08/627,987, now U.S. Pat. No. 5,774,743, issued Jun. 30, 1998; "SYSTEM AND METHOD FOR IMPLEMENTING PERIPHERAL DEVICE BUS MASTERING IN A MOBILE COMPUTER SYSTEM VIA A UNIVERSAL SERIAL BUS CONTROLLER OR AN INFRARED DATA ASSOCIATION CONTROLLER," Ser. No. 08/627,986, now U.S. Pat. No. 5,774,744, issued Jun. 30, 1998; "A DESKTOP PERSONAL COMPUTER SYSTEM HAVING PERIPHERAL DEVICE BUS MASTERING AND METHOD THEREFOR," Ser. No. 08/627,992, now U.S. Pat. No. 5,845,151, issued Dec. 1, 1998; and "SYSTEM AND METHOD FOR IMPLEMENTING PERIPHERAL DEVICE BUS MASTERING IN A DESKTOP PERSONAL COMPUTER SYSTEM VIA AN INTEGRATED DRIVE ELECTRONICS HARD DISK CONTROLLER OR AN EXTENDED CAPABILITIES PORT PARALLEL PORT CONTROLLER" Ser. No. 08/627,988, now U.S. Pat. No. 5,809,333, issued Sep. 15, 1998, all filed concurrently herewith, in the name of the same inventors, and assigned to the same assignee as this Application. The disclosures of the above referenced applications are hereby incorporated by reference into this application.

BACKGROUND OF THE INVENTION

1. Field of the Invention

This invention relates generally to an apparatus and method for transferring data within a computer system and, more specifically, to a system and method which allows for the implementation of peripheral device bus mastering via a general purpose list processor.

2. Background of the Invention

Bus mastering (i.e., the ability of input/output (I/O) devices to take over transactions on their own behalf) is becoming an important strategy in personal computer (PC) systems as the burden on central processing unit (CPU) bandwidth increases. Each reduction in time required by the CPU to control peripheral devices and their data flow results in an increase in available CPU bandwidth that includes operating system overhead for application interfaces and interrupt handling. This means that not only is unattended data transfers to these peripheral devices important, but so is unattended transaction initiation and completion processing. The time savings is especially enhanced when multiple transactions are handled without CPU intervention.

Therefore, a need existed to provide a system and method for implementing peripheral device bus mastering. The system and method must allow for unattended data transfers between the computer system and its peripheral devices. The system and method must also be able to initiate and complete the processing of the unattended transaction. Furthermore, the system and method must be able to handle multiple transactions without CPU intervention thereby further enhancing the time savings of the CPU.

SUMMARY OF THE INVENTION

In accordance with one embodiment of the present invention, it is an object of the present invention to provide a system and method for implementing peripheral device bus mastering.

It is another object of the present invention to provide a system and method for implementing peripheral device bus mastering which allows for unattended data transfers between the computer system and its peripheral devices.

It is still another object of the present invention to provide a system and method for implementing peripheral device bus mastering which is able to initiate and complete the processing of unattended transactions.

It is a further object of the present invention to provide a system and method for implementing peripheral device bus mastering which is able to handle multiple transactions without CPU intervention.

BRIEF DESCRIPTION OF THE PREFERRED EMBODIMENTS

In accordance with one embodiment of the present invention, a system for implementing peripheral device bus mastering in a computer system is disclosed. The system is comprised of Direct Memory Access (DMA) controller means for transferring data to and from memory. List processor means are coupled to the DMA controller means for programming the DMA controller means, generating and sending command signals, and receiving completion status after the transfer of data is complete. Descriptor means are stored in the memory of the desktop PC system. The descriptor means are used for describing each data transfer that the hardware state machine means initiates, controls, and completes. Bus controller means are coupled to the DMA controller means and the list processor means for implementing a memory data transfer request from the DMA controller means and the list processor means. Device controller means are coupled to the DMA controller means and the list processor means for responding to command signals from the list processor means, transferring the data to and from the DMA controller means, and returning completion status to the list processor means after the transfer of data is complete.

In accordance with another embodiment of the present invention, a method for implementing peripheral device bus mastering is disclosed. The method comprises the steps of: providing a system for implementing peripheral device bus mastering; transferring data under a first mode of operation; and transferring the data under a second of mode of operation if the first mode of operation is not used.

The step of providing a system for implementing the peripheral device bus mastering further comprises the steps of: providing Direct Memory Access (DMA) controller means for transferring data to and from memory; providing list processor means coupled to the DMA controller means for programming the DMA controller means, generating and sending command signals, and receiving completion status after the transfer of data is complete, providing bus controller means coupled to the DMA controller means and the list processor means for implementing a memory data transfer request from the DMA controller means and the list processor means; and providing peripheral device controller means coupled to the DMA controller means and the list processor means for responding to command signals from the list processor means, transferring the data to and from the DMA controller means, and returning completion status to the list processor means after the transfer of data is complete.

The step of transferring data under a first mode of operation further comprises the steps of: providing DMA registers within the DMA controller means; providing a start address to locate the data to be transferred; providing a transfer count to define a size of a single contiguous buffer of data, transferring the single contiguous buffer of data from the DMA registers to the device controller; sending a signal to indicate when transfer of the data is complete; and programming the DMA registers for a next transfer of data.

The step of transferring data under a second mode of operation further comprises the steps of: providing a plurality of data buffer descriptor means coupled to the list processor means for programming DMA registers; reading a data buffer descriptor means pointed to by a descriptor address register; programming the DMA registers for transferring the data; transferring the data from a memory buffer to the device controller means; and sending a signal to indicate when the transfer of the data is complete.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

FIG. 2A is a simplified block diagram of another embodiment of the buffer descriptor list used by the system depicted in FIG. 1.

FIG. 3 is a simplified block diagram of a DMA address register used by the system depicted in FIG. 1.

FIG. 4 is a simplified block diagram of a DMA count register used by the system depicted in FIG. 1.

FIG. 5 is a simplified block diagram of a DMA mode register used by the system depicted in FIG. 1.

FIG. 6 is a simplified block diagram of a DMA command register used by the system depicted in FIG. 1.

FIG. 9 is a simplified block diagram of a descriptor address register used by the system depicted in FIG. 1.

FIG. 10 is a simplified block diagram of a forward link register used by the system depicted in FIG. 1.

FIG. 10A is an overview of a single buffer descriptor.

FIG. 11 is a simplified block diagram of a device status descriptor element used by the system depicted in FIG. 1.

FIG. 12 is a simplified block diagram of an interrupt register used by the system depicted in FIG. 1.

FIG. 13A is a simplified block diagram of a device command descriptor element used by the system depicted in FIG. 1.

FIG. 13B is a continuation of FIG. 13A and further lists the bit locations for the device command descriptor element of FIG. 13A.

FIG. 14 is a simplified block diagram of a time slot descriptor used by the system depicted in FIG. 1.

DETAILED DESCRIPTION OF THE PREFERRED EMBODIMENTS

Figure 1:
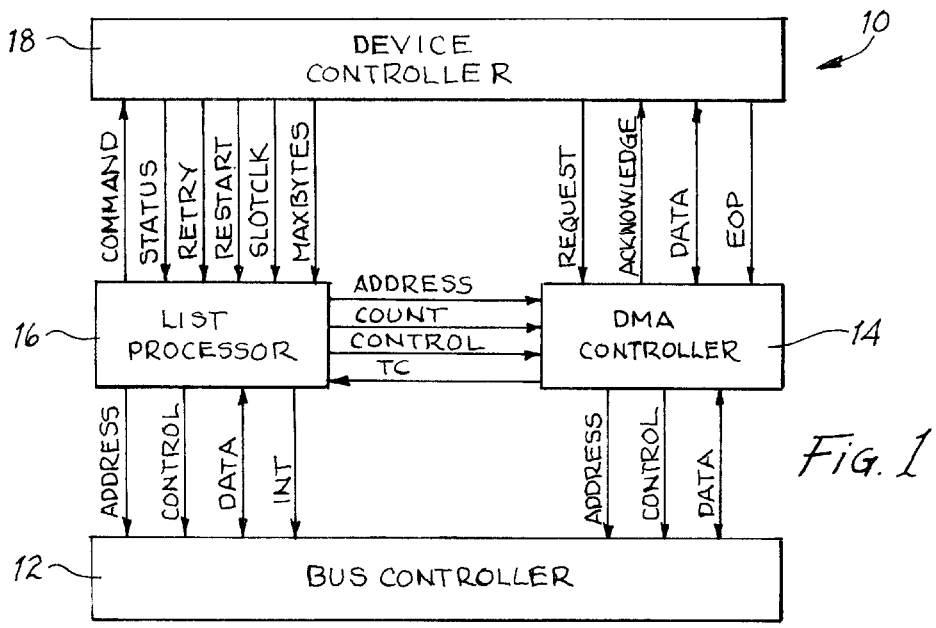
FIG. 1 is a simplified block diagram of a system for implementing peripheral device bus mastering.

Referring to FIG. 1, a system for implementing peripheral device bus mastering (hereinafter system) 10 for a computer system is shown. The system 10 is comprised of four main elements: a bus controller 12, a DMA controller 14, a list processor 16, and a device controller 18.

The bus controller 12 implements the memory data transfer request from the DMA controller 14 and the list processor 16. The DMA controller 14, which is coupled to the bus controller 12, transfers blocks of data between the memory of the computer system and the device controller 18. The DMA controller 14 is implemented as a distributed DMA target slice. The advantages of this are twofold. First, the distributed DMA target slice is a pre-existing block. Thus, it does not require a new design. Second, since the DMA target slice is an industry standard interface, standard software may be leveraged as well.

Figure 2:
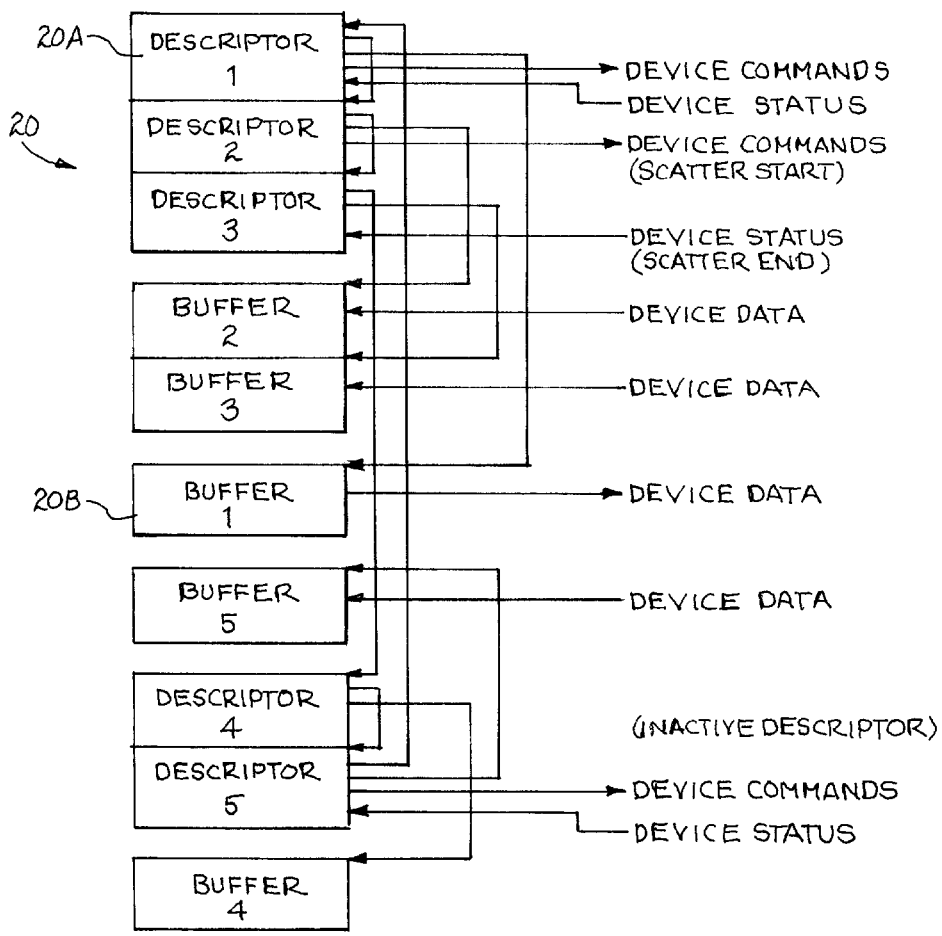
FIG. 2 is a simplified block diagram of a buffer descriptor list used by the system depicted in FIG. 1.
Figure 7:
FIG. 7 is a simplified block diagram of a DMA mask register used by the system depicted in FIG. 1.
Figure 8:
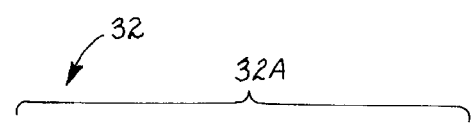
FIG. 8 is a simplified block diagram of a DMA status register used by the system depicted in FIG. 1.

The list processor 16 is defined as any element that programs the DMA controller 14 and the device controller 18 from information in a buffer descriptor list 20 (see FIG. 2). The list processor 16 handles linked sequences of individual data buffer descriptors 20A (see FIG. 2) by programming the DMA controller 14, sending commands to the device controller 18, and receiving completion status from the device controller 18, all as required by the buffer descriptor list 20. The list processor 16 may be implemented as an embedded device (i.e. microcontroller) or as part of the computer system's host CPU. During system operation, it is possible to dynamically switch between the embedded list processor and the host CPU. This selectability is a result of the modular approach to the general solution.

The device controller 18 is coupled to the DMA controller 14 and the list processor 16. The device controller 18 responds to commands from the list processor 16, transfers data to and from the DMA controller 14, and returns completion status to the list processor 16. Four embodiments of the device controller 18 are: a Universal Serial Bus (USB) controller, an Infrared Data Association (IrDA) controller, an Integrated Drive Electronics (IDE) hard disk controller, and an Extended Capabilities Port (ECP) parallel port controller. The use of a particular device controller 18 depends on the peripheral device to be controlled. For example, a USB controller is generally used for controlling medium and slow speed peripheral devices such as a keyboard, a mouse, audio devices, gaming devices and telephone hook-ups. IrDA controllers are generally used to control communications from one computer system to another computer system. IDE hard disk controllers are used to control communications between the computer system and mass storage devices such as a hard drive, a floppy drive, or a CD ROM device. ECP parallel port controllers are used to control communications between the computer system and parallel port peripherals such as a printing device.

Referring to FIG. 2, one embodiment of the buffer descriptor list 20 is shown. The buffer descriptor list is created in the memory of the computer system. The format of the buffer descriptor list 20 is defined in such a manner so as to minimize the hardware requirements of implementing the list processor 16 (FIG. 1), to provide flexible interface for the user, and to allow extension of the system 10 (FIG. 1). Each element of the buffer descriptor list 20 describes a data transfer that the list processor 16 initiates, controls, and completes. Support for periodic and aperiodic descriptors 20A are included in a general fashion that satisfies the requirements of different types of device controllers 18 (FIG. 1). Sub-list processing is also defined for support of aperiodic descriptors. Scatter/gather buffers 20B, used primarily with mass storage transfers, are also supported. Transfers that end in an error may be optionally retried. Interrupts are enabled both globally and in individual descriptors 20A for finer interrupt control.

Referring to FIG. 2A, another embodiment of the descriptor list 20' is shown. In this embodiment, the descriptor 20A' is allowed to "call" a sub-list 20B'. The operation of this embodiment will be described below.

OPERATION

With reference to FIGS. 1–14, a discussion of the operation of system 10 will follow. The system 10 has two modes of operation. The first mode is a single buffer transfer mode. The single buffer transfer mode is directly compatible with a distributed DMA model. The distributed DMA registers within the DMA controller 14 are programmed to transfer a single contiguous buffer of data. When the transfer is complete, software must intervene to program the DMA registers for the next transfer. The second mode of operation is a multiple buffer transfer mode. The multiple buffer transfer mode uses linked lists of buffer transfer descriptors 20 to program the distributed DMA registers and to initiate transfers independent of software.

The two modes arise from two distinct modules: the DMA controller 14 and the list processor 16. The DMA controller 14 implements a Peripheral Component Interconnect (PCI) bus mastering interface based on a distributed DMA slave programming module. The list processor 16 adds a layer of functionality on top of the DMA controller 14 that handles a versatile descriptor list 20 of individual DMA processes. The list may include sub-lists 20B' of scattered buffers for a single DMA process.

DMA TRANSFERS

The single buffer transfer mode is directly compatible with a distributed DMA model. The system 10 is capable of implementing a slave portion of the distributed DMA model. It is a complete DMA function that is programmed by software for each individual buffer transfer. A 32 bit start address is provided by an address register 22 (FIG. 3) and a 24 bit byte count by a count register 24 (FIG. 4). The direction of the data transfer is controlled by the DIR field 26A in a mode register 26 (FIG. 5). The DMA controller 14 is controlled by several bits. The DMA controller 14 may be held in an idle state by setting the DISABLE bit 28A in the command register 28 (FIG. 6), the DMA controller 14 may be held inactive between bus transactions by setting the MASK bit 30A in the mask register 30 (FIG. 7), or the DMA controller 14 can be reset by writing the master clear register.

During a transfer, the current address is readable in the address register 22. Likewise, the current count is readable in the count register 24. When a transfer is complete, the MASK bit 30A is set and the Terminal Count (TC) field 32A of the DMA status register 32 (FIG. 8) is set to 1111b. Either indication may be monitored for transfer completion. If the TC interrupt is enabled, an interrupt is generated when TC is asserted.

A number of the register bits defined by the legacy DMA controller 14 are tied off. They are tied off in a benign fashion such that they reflect the actual characteristics of this implementation.

LIST DESCRIPTOR EXECUTION

The usage of a descriptor list 20 allows for multiple transfers to occur untended by software. The list processor 16 is programmed with a pointer to the head of a linked list of descriptors 20A, and enabled by setting the ENABLE bit 34A in the descriptor address register 34 (FIG. 9). The list processor I/O registers immediately follow the DMA controller I/O registers.

When the list processor 16 is enabled, the buffer descriptor 20A pointed to by the descriptor address register 34 is read in a single burst access. The descriptor 20A contains a forward link, buffer address, current address, transfer count, current count, command state, and time slot (FIG. 10A). The forward link (i.e., the address of the next transfer descriptor 20A list 20) is loaded into the internal forward link register 36 (FIG. 10). The device controller command bits are copied to the device controller 18. The BUSY bit 38A in the device controller status 38 (FIG. 11) is set to one and the DMA controller registers are loaded from the descriptor 20A. The TC 32A and the MASK bit 30A are then cleared. The DMA controller 14 controls the transfer as described above. When the TC bit 32A is set, the list processor 16 copies the device controller status bits from the device controller 18 and clears the BUSY bit 38A. The list processor 16 also updates the descriptor address register 34 with the forward link from the internal forward link register 36. If the EOT bit 36A of the internal forward link register 36 was a one, then the List End Interrupt (LISTINT) interrupt bit 40A in the interrupt register 40 (FIG. 12) is set and the ENABLE bit 34A in the descriptor address register 34 is cleared. If the LISTINT was enabled, the setting of the LISTINT bit 40A also causes an interrupt to be generated.

The list processor's ENABLE bit 34A may be set by software or a restart signal from the device controller 18. This allows periodic or some other form of automatic handling of the list processing. Automatic restart is enabled by the RESTART bit 34B in the descriptor address register 34.

PERIODIC DESCRIPTORS

Periodic descriptors are created by setting the Periodic (PER) bit 42A of the device command 42 (FIG. 13). If the individual descriptors 20A are periodic, they will require processing at fixed intervals of time. An internal 16 bit timer is cleared to zero when the list processing starts, i.e., when the ENABLE bit 34A is set to one, and is incremented by a clock generated by the device controller 18. If the PER bit 42A is set in the descriptor's command, the processing of the descriptor 20A waits until the timer is greater than or equal to the descriptor's time slot value (TSLOT) 44A (FIG. 14). One must ensure that times allocated to various descriptors 20A do not overlap. The length of time is specified by the descriptor's end time slot value (ESLOT) 44B. If the transfer is not complete when the timer input reaches the ESLOT value 44B, the list processor 16 forces the TC signal 32A to end the transfer, then updates the descriptor's current address and current count, leaving the BUSY bit 38A set. One must also ensure that time slots are re-scheduled when descriptors 20A are added to or deleted from the descriptor list 20.

APERIODIC DESCRIPTORS

Aperiodic descriptors are created by clearing the PER bit 42A in the device command register 40. Aperiodic descriptors differ from periodic descriptors in that a restart signal being asserted by the device controller 18 will cause the aperiodic descriptors to be skipped until the descriptor 20A with its EOT flag 36A set is processed. This allows a class of transfers that may or may not be processed depending on the occurrence of a critical event. If that event is signalled during the processing of an aperiodic transfer, that transfer is completed normally. If an aperiodic descriptor is skipped, the MUST flag 42B in the device command 42 is set and an internal MUST pending flip-flop (not shown) is set. When the entire descriptor list 20 is finished being processed, the MUST pending flip-flop is copied to a MUST flip-flop (not shown) and the MUST pending flip-flop is cleared. If the MUST flip-flop is set during list processing, aperiodic descriptors with their MUST flag 42B clear are skipped. Aperiodic descriptors with their MUST flag 42B set have their MUST flag 42B reset and then are processed as described above. This ensures fair processing of all aperiodic descriptors with a minimal hardware cost.

Aperiodic descriptors are also skipped if their transfer count is larger than a maximum value (MAXBYTES) from the device controller 18. The device controller 18 will continually update the value based on the time left until the restart signal and the data rate of the peripheral device. As above, if the aperiodic descriptor is skipped, its MUST flag 42B is set in the descriptor command and the MUST pending flip-flop is set.

SUB-LIST CALLS

A special descriptor is provided that allows the calling of a sub-list 20B'. When a descriptor 20A' with the SUBLIST bit set in the command is encountered, the forward pointer is saved in an internal register and the descriptor pointer is updated with the address of the head of the sub-list 20B' from the buffer address. The sub-list 20B' is then processed normally until the EOT flag 36A is encountered, which causes the descriptor pointer to be loaded with the contents of the internal register. Since a single internal register is provided, the level of sub-lists 20B' is limited to one.

The only command bit that is valid in a sub-list call descriptor 20B', other than the sub-list bit, is the ACTIVE bit. This allows sub-list calls to be unconditionally skipped. They may also be conditionally skipped if the maximum count input is greater than the transfer count.

Unallocated time slots may be easily used by inserting sub-list calls 20B' to a sub-list of aperiodic descriptors. Since the same sub-list is called, and the descriptor skip processing is performed on sub-lists in the same manner as on the main list, the aperiodic transfers will fill in the used time and maximize device bandwidth usage.

Time slots allocated for read transfers may not be completely used if the read transfer is short. The unused portion of the time slot may be used by inserting a conditional sub-list call 20C' to the sub-list of aperiodic descriptors. The use of a conditional call is important since there is a limited amount of time prior to the following time slot.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A system for implementing peripheral device bus mastering in a computer system comprising, in combination:

Direct Memory Access (DMA) controller means for transferring data to and from memory of said computer system;

list processor means coupled to said DMA controller means for programming said DMA controller means, generating and sending command signals, and receiving completion status after said transfer of data is complete;

bus controller means coupled to said DMA controller means and said list processor means for implementing a memory data transfer request from said DMA controller means and said list processor means; and device controller means coupled to said DMA controller means and said list processor means for receiving and responding to said command signals from said list processor means, transferring said data to and from said DMA controller means, and generating and returning said completion status to said list processor means after said transfer is complete.

2. A system for implementing peripheral device bus mastering in accordance with claim 1 wherein said DMA controller means is implemented as a distributed DMA target slice.

3. A system for implementing peripheral device bus mastering in accordance with claim 1 wherein said list processor means is an embedded microcontroller in said computer system.

4. A system for implementing peripheral device bus mastering in accordance with claim 1 wherein said list processor means is a host CPU of said computer system.

5. A system for implementing peripheral device bus mastering in accordance with claim 1 further comprising data buffer descriptor means created in said memory of said computer system for describing a data transfer that said list processor means initiates, controls, and completes.

6. A system for implementing peripheral device bus mastering in accordance with claim 1 wherein said device controller means is a Universal Serial Bus (USB) controller.

7. A system for implementing peripheral device bus mastering in accordance with claim 1 wherein said device controller means is an Infrared Data Association (IrDA) controller.

8. A system for implementing peripheral device bus mastering in accordance with claim 1 wherein said device controller means is an Integrated Drive Electronics (IDE) hard disk controller.

9. A system for implementing peripheral device bus mastering in accordance with claim 1 wherein said device controller means is an Extended Capabilities Port (ECP) parallel port controller.

10. A method for implementing peripheral device bus mastering comprising the steps of:

providing a system for implementing peripheral device bus mastering wherein said step of providing a system for implementing peripheral device bus mastering further comprises the steps of:

providing Direct Memory Access (DMA) controller means for transferring data to and from memory;

providing list processor means coupled to said DMA controller means for programming said DMA controller means, generating and sending command signals, and receiving completion status after said transfer of data is complete;

providing bus controller means coupled to said DMA controller means and said list processor means for implementing a memory data transfer request from said DMA controller means and said list processor means; and providing device controller means coupled to said DMA controller means and said list processor means for receiving and responding to said command signals from said list processor means, transferring said data to and from said DMA controller means, and generating and returning said completion status to said list processor means after said transfer is complete;

transferring data under a first mode of operation; and transferring said data under a second mode of operation if said first mode of operation is not used.

11. The method of claim 10 wherein said step of transferring data under a first mode of operation further comprises the steps of:

providing DMA registers within said DMA controller means;

providing a start address to locate data to be transferred;

providing a transfer count to define a size of a single contiguous buffer of data;

transferring said single contiguous buffer of data as defined by said DMA registers to said device controller;

sending a signal to indicate when transfer of said data is complete; and programming said DMA registers for a next transfer of data.

12. The method of claim 10 wherein said step of transferring data under a second mode of operation further comprises the steps of:

providing a plurality of data buffer descriptor means coupled to said list processor means for programming DMA registers;

reading a data buffer descriptor means pointed to by a descriptor address register;

programming said DMA registers for transferring data;

transferring said data as defined by said DMA registers to said device controller means; and sending a signal to indicate when transfer of said data is complete.

13. The method of claim 12 wherein said plurality of data buffer descriptor means are periodic descriptors.

14. The method of claim 12 wherein said plurality of data buffer descriptor means are aperiodic descriptors.

* * * * *